United States Patent
Bruce et al.

(10) Patent No.: US 8,819,309 B1
(45) Date of Patent: Aug. 26, 2014

(54) LOW LATENCY BYPASS BUFFER

(71) Applicant: ARM Limited, Cambridge (GB)

(72) Inventors: Alistair Crone Bruce, Sheffield (GB); Andrew David Tune, Sheffield (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 13/918,023

(22) Filed: Jun. 14, 2013

(51) Int. Cl.
*G06F 13/38* (2006.01)
*G06F 3/06* (2006.01)

(52) U.S. Cl.
USPC ............ 710/52; 710/2; 710/5; 710/8; 710/11; 710/33

(58) Field of Classification Search
None
See application file for complete search history.

(56) References Cited

U.S. PATENT DOCUMENTS

| | | | |
|---|---|---|---|
| 5,983,278 | A | 11/1999 | Chong et al. |
| 6,067,301 | A | 5/2000 | Aatresh |
| 6,222,822 | B1 | 4/2001 | Gerardin et al. |
| 6,546,017 | B1 | 4/2003 | Khaunte |
| 7,281,086 | B1 | 10/2007 | More et al. |
| 7,296,109 | B1 | 11/2007 | Zhang et al. |
| 7,631,132 | B1 | 12/2009 | Neuman |
| 7,860,120 | B1 | 12/2010 | Wang et al. |
| 2003/0161303 | A1 | 8/2003 | Mehrvar et al. |
| 2004/0218617 | A1 | 11/2004 | Sagfors |
| 2004/0257995 | A1 | 12/2004 | Sandy et al. |
| 2007/0081515 | A1 | 4/2007 | Dielissen et al. |
| 2008/0104283 | A1 | 5/2008 | Shin et al. |
| 2010/0201377 | A1 * | 8/2010 | Arsovski et al. ............ 324/612 |

FOREIGN PATENT DOCUMENTS

| | | |
|---|---|---|
| KR | 20010038486 | 5/2011 |
| WO | WO2012/101054 | 8/2012 |

OTHER PUBLICATIONS

"Low Latency Queuing", Wikipedia, 2 pages, printed on Jun. 10, 2013.
Wu, E. H-K et al., "Low latency and efficient packet scheduling for streaming applications", Science Direct, Computer Communications, vol. 29, (2006), pp. 1413-1421.

* cited by examiner

*Primary Examiner* — Scott Sun
(74) *Attorney, Agent, or Firm* — Nixon & Vanderhye P.C.

(57) ABSTRACT

Buffer circuitry 14 is provided with shared buffer circuitry 20 which stores, in order of reception time, data transaction requests received from one or more data transaction sources. The buffer circuitry 14 operates in either a bypass mode or a non-bypass mode. When operating in the bypass mode, any low latency data transaction requests stored within the shared buffer circuitry are selected in order for output in preference to data transaction requests that are not low latency data transaction requests. In the non-bypass mode, transactions (whether or not they are low latency transactions) are output from the shared buffer circuitry 20 in accordance with the order in which they are received into the shared buffer circuitry 20. The switch between the bypass mode and the non-bypass mode is made in dependence upon comparison of a detected rate of output of low latency data transaction requests compared to a threshold value. If the rate exceeds the threshold value, then the switch is made to the non-bypass mode so that data transaction requests which are not low latency data transaction requests are permitted a fair share of the output bandwidth.

14 Claims, 5 Drawing Sheets

LOW LATENCY BYPASS BUFFER

BACKGROUND OF THE INVENTION

1. Field of the Invention

This invention relates to the field of buffering data transaction requests. More particularly, this invention relates to the buffering of data transaction requests in a system in which at least some of the data transaction requests are managed so as to provide a lower latency in their servicing.

2. Description of the Prior Art

It is known to provide buffers for receiving data transaction requests. Such buffers may be placed at various positions within a system, such as, for example, at the input to a memory or the input to an I/O device. Such buffers may be configured to receive and store data transaction requests sent over communication circuitry, such as interconnect circuitry within a system-on-chip integrated circuit, and then pass the received and stored data transaction requests to their destination when this is able to receive the data transaction requests. Providing such buffers has various advantages, such as avoiding congestion in the communication mechanisms which transmit the data transaction requests as the transmission may be completed by receipt of the data transaction request into the buffer thereby freeing the communication circuitry to perform other communication tasks. Such buffers may also be used to increase the efficiency of utilisation of the target device to which the data transaction requests are directed.

It is known to provide systems in which data transaction requests may be treated differently depending upon their latency or other requirements. It is desirable that the buffering of data transaction requests should be performed in a manner which is suitable for low circuit overhead and low power consumption implementation and yet permits data transaction requests associated with low latency requirements to be serviced with low latency. Furthermore, such buffering should not allow circumstances to arise in which data transaction requests which are not low latency data transaction requests become starved of processing and are held for an undesirably long time behind low latency data transaction requests that are given undue priority. Furthermore, the buffering system should desirably make good use of its bandwidth and other capabilities whatever the mix between low latency data transaction requests and data transaction requests which are not low latency data transaction requests.

SUMMARY OF THE INVENTION

Viewed from one aspect the present invention provides an apparatus for buffering received data transaction requests, said apparatus comprising:

shared buffer circuitry configured to store, in order of reception time at said shared buffer circuitry, data transaction requests received from one or more data transaction sources;

low latency identifying circuitry configured to identify low latency data transaction requests associated with low latency handling from among said data transaction requests received from said one or more data transaction sources and stored in said shared buffer circuitry;

output selection circuitry configured to select a data transaction request for output from said shared buffer circuitry and to operate in a selectable one of:

a bypass mode in which said data transaction request selected for output is one of:

(a) if any low latency data transaction requests are stored in said shared buffer circuitry, an earliest received low latency data transaction stored in said shared buffer circuitry; and (b) if no low latency data transaction requests are stored in said shared buffer circuitry, an earliest received data transaction request among any data transaction requests stored in said shared buffer memory; and a non-bypass mode in which said data transaction request selected for output is an earliest received data transaction request among any data transaction requests stored in said shared buffer memory;

rate detection circuitry configured to detect a rate of output of low latency data transaction requests from said shared buffer circuitry; and bypass control circuitry configured to compare said rate with a threshold value and to control said output selection circuitry to operate in one of:

said bypass mode when said rate is less than said threshold value; and said non-bypass mode when said rate is greater than said threshold value.

The present technique provides a buffering system in which both low latency data transaction requests and data transaction requests which are not low latency data transaction requests are stored within the shared buffer circuitry. Storing the data transaction requests together in this way enables their ordering to be preserved as well as avoiding the problems and complexities which may be introduced when data transaction requests are split into more than one queue in dependence upon their latency or other requirements. Switching the mode of operation of the output selection circuitry between the bypass mode and the non-bypass mode in dependence upon a detected rate of output of low latency data transaction requests permits the low latency data transaction requests to be handled in a manner in which the action of the buffer gives them a minimum bandwidth allocation, and yet which also provides a maximum latency that will be associated with data transaction requests which are not low latency data transaction requests. Providing the detected rate does not exceed the threshold value, then low latency data transaction requests are selected for output whenever they are present thereby giving a behaviour to the buffering in which it appears to provide a minimum level of bandwidth to low latency data transaction requests that corresponds to the threshold rate. When the threshold rate is exceeded, the switch to the non-bypass mode ensures that all of the buffered data transaction requests will be output in turn, including those data transaction requests which are not low latency data transaction requests, thereby ensuring that these are not starved of service (i.e. are not inappropriately blocked from output for an excessive amount of time or permanently due to the presence of a large number of low latency data transaction requests).

Low latency data transaction requests may be identified by the latency identifying circuitry in a variety of different ways. In some embodiments, a quality of service (QoS) value field associated with each data transaction request may be read and used to determine whether or not that data transaction request is or is not a low latency data transaction request. In other embodiments, a source identifier field identifying the transaction source (circuitry which generated the transaction or the transaction master) may be read and used to infer whether or not the data transaction request requires low latency handling, e.g. data transaction requests originating from a general purpose processor may be treated as low latency data transaction requests as they are generally more latency intolerant, whereas data transaction requests originating from a graphics processing unit may be treated as not being low latency data transaction requests as such data transaction requests are typically more tolerant of higher latency values.

In other embodiments, the latency requirements of a data transaction request may be inferred from a memory address value associated with a data transaction request. Thus, for example, ranges of address values typically accessed by a general purpose processor may be used to infer desired low latency handling whereas ranges of address values typically accessed by a graphics processing unit may be used in infer that there is no low latency requirement for such data transaction requests.

The latency identifying circuitry may in some embodiments mark data transaction requests which have been identified as associated with low latency with a low latency indication flag. Such a flag may be stored together with the other data specifying the data transaction request within the shared buffer circuitry. The low latency indication flag may also be stored elsewhere, such as, for example, within the output selection circuitry, or within its own special purpose store provided as part of the buffer mechanism.

The low latency indication flag may be used to control the output selection circuitry. In addition, in some embodiments, the low latency indication flag may be output from the shared buffer circuitry together with the associated data transaction request for use in controlling subsequent processing associated with that data transaction request. As an example, the subsequent processing could be controlled in respect of whether or not the data transaction request is permitted to pre-empt one or more preceding pending data transaction requests that are being serviced.

The bypass control circuitry serves to compare the detected rate with a threshold value to control the output selection circuitry and/or selection step to operate in either the bypass mode or the non-bypass mode. In some embodiments this control may be subject to a burstiness allowance that permits the rate detected to exceed the threshold value for a predetermined time without selection of the non-bypass mode. Thus, a relatively short high rate burst of low latency data transaction requests may be permitted without triggering a switch to the non-bypass mode, as such relatively short bursts will not unduly interfere with the eventual processing of data transaction requests which are not low latency data transaction requests. However, if the bursts of low latency data transaction requests become too long, then a switch should be made to the non-bypass mode in order that data transaction requests which are not low latency data transaction requests are given a fair share of the output bandwidth of the buffer system.

Viewed from another aspect the present invention provides an apparatus for buffering received data transaction requests, said apparatus comprising:
  shared buffer means for storing, in order of reception time at said shared buffer means, data transaction requests received from one or more data transaction sources;
  low latency identifying means for identifying low latency data transaction requests associated with low latency handling from among said data transaction requests received from said one or more data transaction sources and stored in said shared buffer means;
  output selection means for selecting a data transaction request for output from said shared buffer means and for operating in a selectable one of:
    a bypass mode in which said data transaction request selected for output is one of:
      (a) if any low latency data transaction requests are stored in said shared buffer means, an earliest received low latency data transaction stored in said shared buffer means; and
      (b) if no low latency data transaction requests are stored in said shared buffer means, an earliest received data transaction request among any data transaction requests stored in said shared buffer means; and
    a non-bypass mode in which said data transaction request selected for output is an earliest received data transaction request among any data transaction requests stored in said shared buffer means;
  rate detection means for detecting a rate of output of low latency data transaction requests from said shared buffer means; and
  bypass control means for comparing said rate with a threshold value and to control said output selection means to operate in one of:
    said bypass mode when said rate is less than said threshold value; and
    said non-bypass mode when said rate is greater than said threshold value.

Viewed from a further aspect the present invention provides a method of buffering received data transaction requests, said method comprising the steps of:
  storing in shared buffer circuitry, in order of reception time at said shared buffer circuitry, data transaction requests received from one or more data transaction sources;
  identifying low latency data transaction requests associated with low latency handling from among said data transaction requests received from said one or more data transaction sources and stored in said shared buffer means;
  selecting a data transaction request for output from said shared buffer circuitry using a selectable one of:
    a bypass mode in which said data transaction request selected for output is one of:
      (a) if any low latency data transaction requests are stored in said shared buffer circuitry, an earliest received low latency data transaction stored in said shared buffer circuitry; and
      (b) if no low latency data transaction requests are stored in said shared buffer circuitry, an earliest received data transaction request among any data transaction requests stored in said shared buffer circuitry; and
    a non-bypass mode in which said data transaction request selected for output is an earliest received data transaction request among any data transaction requests stored in said shared buffer circuitry;
  detecting a rate of output of low latency data transaction requests from said shared buffer circuitry; and
  comparing said rate with a threshold value and to control said steps of selecting to operate in one of:
    said bypass mode when said rate is less than said threshold value; and
    said non-bypass mode when said rate is greater than said threshold value.

The above, and other objects, features and advantages of this invention will be apparent from the following detailed description of illustrative embodiments which is to be read in connection with the accompanying drawings.

DESCRIPTION OF THE EMBODIMENTS

Figure 1:
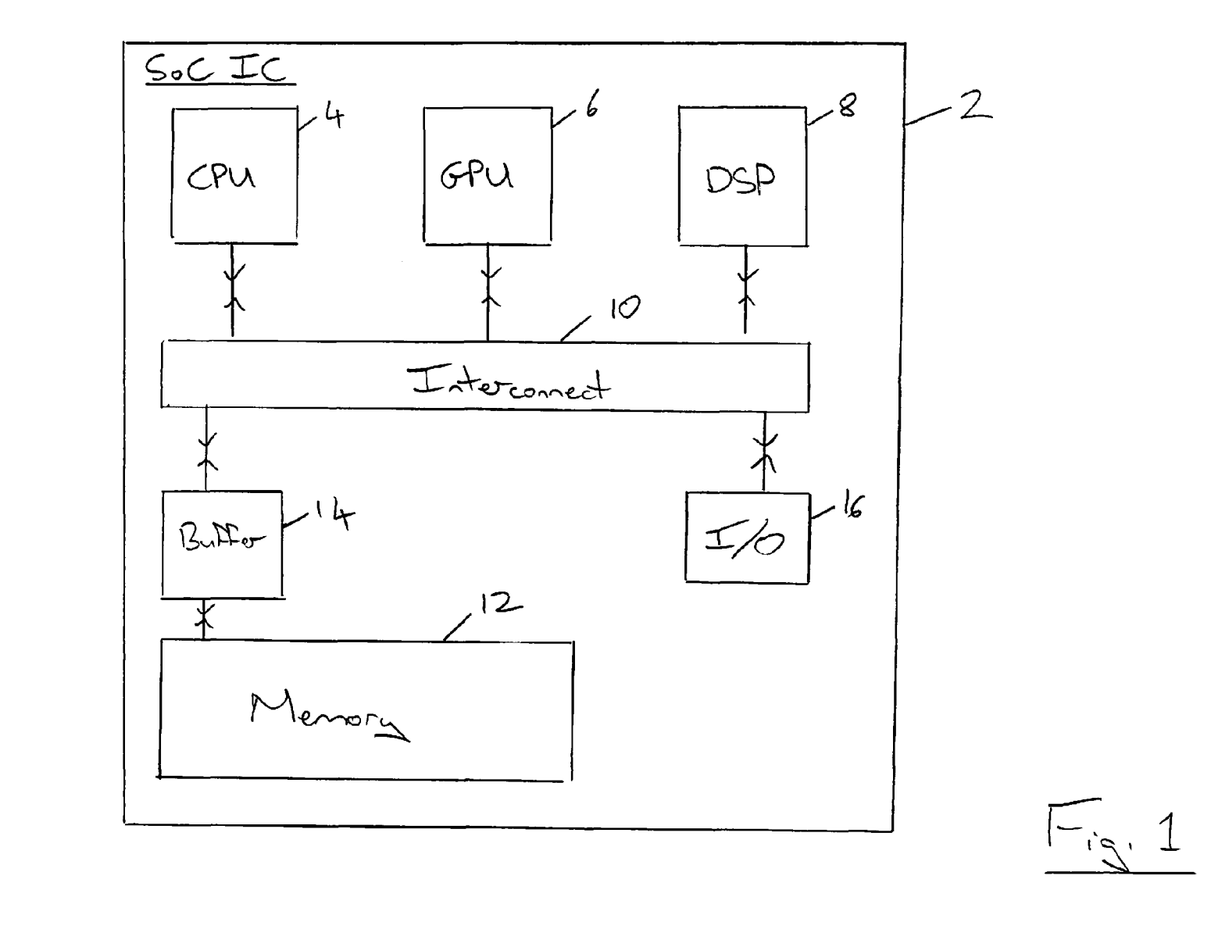
FIG. 1 schematically illustrates a system-on-chip integrated circuit including multiple sources of data transaction requests coupled by interconnect circuitry and via buffer circuitry to a memory.

FIG. 1 schematically illustrates a system-on-chip integrated circuit 2 including a general purpose processor 4, a graphics processing unit 6 and a digital signal processing unit 8 all connected via interconnect circuitry 10 to a main memory 12 via buffer circuitry 14 or to input/output circuitry 16. It will be appreciated that buffer circuitry could also be used between the interconnect circuitry 10 and the input/output circuitry 16 in other embodiments. Furthermore, it will be appreciated that the present techniques could be used with a wide variety of different sources of data transaction requests beyond those illustrated in the example embodiment of FIG. 1.

In the example of FIG. 1, the general purpose processor 4 will produce data transaction requests which are generally intolerant to high latency levels, i.e. high latency will adversely impact the performance/behaviour of the general purpose processor 4, and accordingly such data transaction requests should be treated as low latency data transaction requests by the buffer circuitry 14. Conversely, the graphics processing unit 6 may generate a high volume of data transaction requests and typically require a high bandwidth for the servicing of the data transaction requests, but be relatively tolerant to high levels of latency associated with its data transaction requests. Thus, in some embodiments, data transaction requests may include a field specifying a quality-of-service level associated with those data transaction requests. Data transaction requests from the general purpose processor 4 may have a quality of service field which indicates that they should be treated as low latency data transaction requests. Conversely, data transaction requests from the graphics processing unit 6 may have a quality-of-service field indicating that they need not be treated as low latency data transaction requests.

The data transaction requests may also include a source identifier field which serves to identify the source which generated that data transaction request, e.g. identify whether the data transaction request was generated by the general purpose processor 4, the graphics processing unit 6 or the digital signal processor 8. Such source identifier fields may be used to infer whether or not a particular data transaction request is or is not a low latency data transaction request.

In other embodiments different sources of data transaction requests may typically access different ranges of memory address space and accordingly the memory address associated with a particular data transaction request can be used to infer the source of that data transaction request and in turn infer whether or not that data transaction request should be treated as a low latency data transaction request.

The data transaction requests generated by one or more of the general purpose processor 4, the graphics processing unit 6 and the digital signal processing unit 8 are transferred via the interconnect circuitry 10 to the buffer circuitry 14 when they have memory addresses which map to the memory address space of the main memory 12. The buffer circuitry 14 is able to receive and store these data transaction requests and provide a queue of data transaction requests for servicing by the main memory 12. The action of the buffer circuitry 14 serves to clear the data transaction requests from the interconnect circuitry 10 thereby freeing this for other uses. Furthermore, the provision of a queue of data transaction requests pending service by the main memory 12 generally permits a more efficient use to be made of the main memory 12.

Although the input/output circuitry 16 was illustrated in FIG. 1 as directly connected to the interconnect circuitry 10, it will be appreciated that in other embodiments further buffer circuitry may be provided between the input/output circuitry 16 and the interconnect circuitry 10 to serve a similar function as the buffer circuitry 14 which is provided between the interconnect circuitry 10 and the main memory 12.

Figure 2:
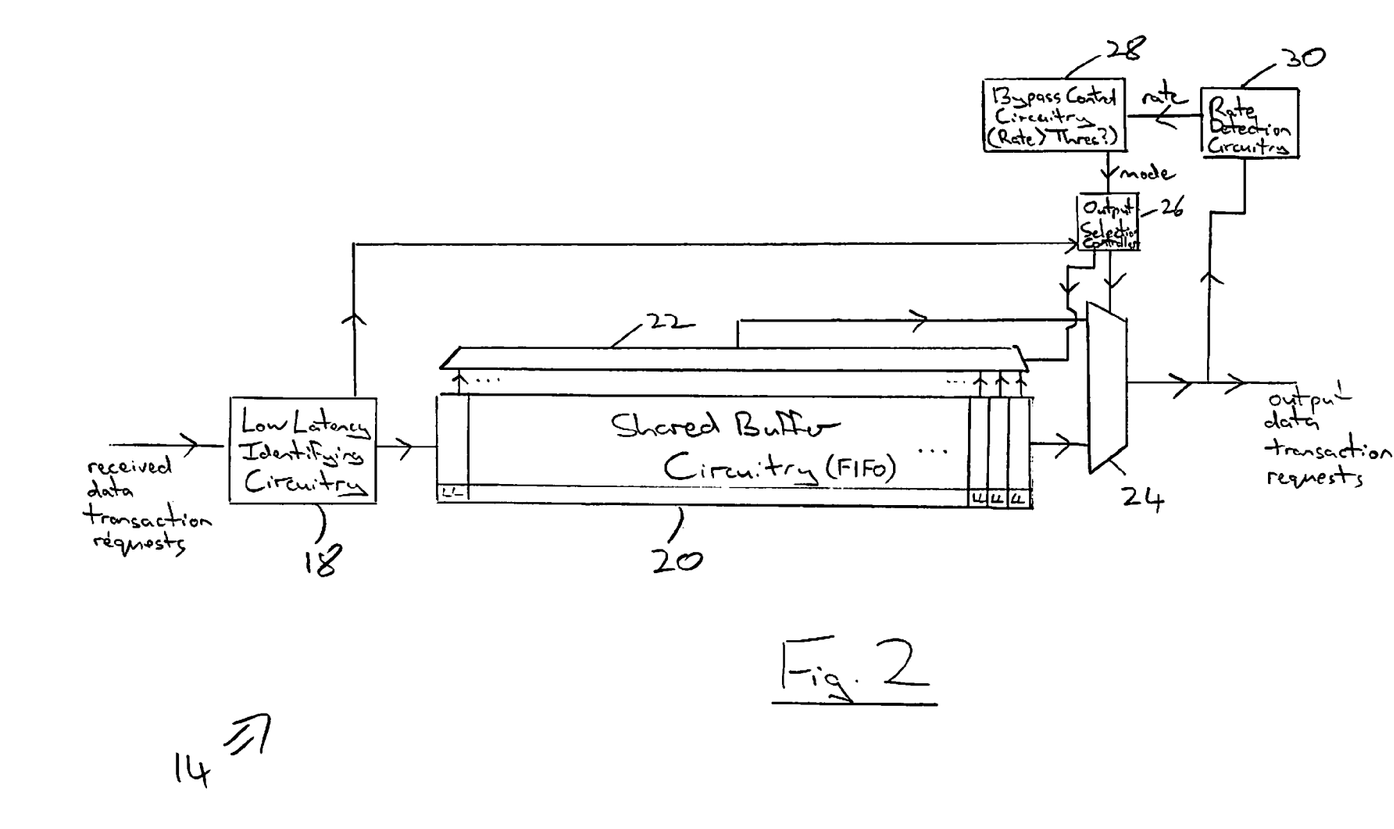
FIG. 2 schematically illustrates buffer circuitry with provision to allow low latency data transaction requests to bypass the normal queuing providing the rate of output of such low latency data transaction requests does not exceed a threshold value.

FIG. 2 schematically illustrates the buffer circuitry 14 in more detail. Data transaction requests are received at low latency identifying circuitry 18 which serves to identify whether or not each data transaction request is or is not a low latency data transaction request. Such identification may be done in a variety of different ways, such as, for example, using a quality-of-service field value, a source identifier field value or a memory address associated with the data transaction request as discussed above.

Data transaction requests once they have or have not been identified as low latency data transaction requests are passed to and stored within shared buffer circuitry 20 which functionally serves as a first-in-first-out (FIFO) memory. It will be appreciated by those in this technical field that such shared buffer circuitry may be implemented in a wide variety of different ways, such as in the form of a ring buffer or a memory with pointer values indicating the input position for new data and the output position for data to be output. The shared buffer circuitry serves to store all of the received data transaction requests whether or not they are identified as low latency data transaction requests. No data transaction requests are discarded and the ordering of the data transaction request is preserved by virtue of the ordering in which they are stored in the shared buffer circuitry 20. The use of shared buffer circuitry 20 rather than multiple buffers each storing data transaction requests of different latency/priority serves to directly and naturally preserve the ordering of the data transaction requests as well as avoiding the complexities and difficulties which are introduced by a need to arbitrate between data transaction requests stored within different buffers.

Output selection circuitry is provided in the form of a first multiplexer 22, a second multiplexer 24 and an output selection controller 26. The output selection controller 26 controls the first multiplexer 22 to select from the shared buffer circuitry 20 the earliest received low latency data transaction request whenever there is at least one low latency data transaction request stored within the shared buffer circuitry 20. The second multiplexer 24 is controlled by the output selection controller 26 to select for output from the buffer circuitry 14 either the low latency data transaction request (if any) selected by the multiplexer 22 or the earliest received of any of the data transaction requests (both low latency data transaction requests and data transaction requests which are not low latency data transaction requests) that is currently stored within the shared buffer circuitry 20 and is indicated as having received the output end of the shared buffer circuitry 20 in FIG. 2. As will be described further below, the output selection controller 26 may operate either in accordance with a bypass mode of operation or in accordance with a non-bypass mode of operation. The mode in which the output selection controller 26 operates is set by bypass control circuitry 28. The bypass control circuitry 28 receives a rate signal from rate detection signal 30 which monitors the output from the second multiplexer 24 and generates a rate signal indicating a rate of output of low latency data transaction requests. The bypass control circuitry compares the detected rate with a threshold value. If the detected rate exceeds the threshold value for a given number of output data transaction requests (corresponding to a permitted degree of burstiness), then the bypass control circuitry outputs a mode signal to control the output selection controller 26 to operate in accordance with a non-bypass mode. If the detected rate does not exceed the threshold value, then the mode signal output by the bypass control circuitry 28 controls the output selection controller 26 to operate in accordance with a bypass mode.

Figure 3:
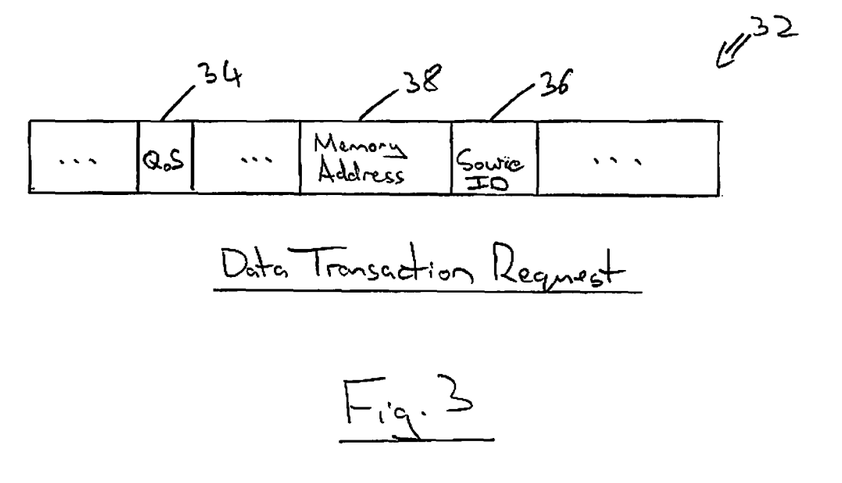
FIG. 3 schematically illustrates a data transaction request.

FIG. 3 schematically illustrates a data transaction request 32. This data transaction request includes a wide variety of different fields. Examples of the fields which may be included are a quality-of-service field 34, a source identifier field 36 and a memory address field 38. Any of these fields 34, 36, 38 may be used to infer or determine whether or not a given data transaction request is or is not a low latency data transaction request as previously discussed (combinations of these fields may also be used). It will be appreciated that the data transaction request need not include all of these fields 34, 36, 38 and will typically include further fields, such as a data payload field in the case of a data write request.

Figure 4:
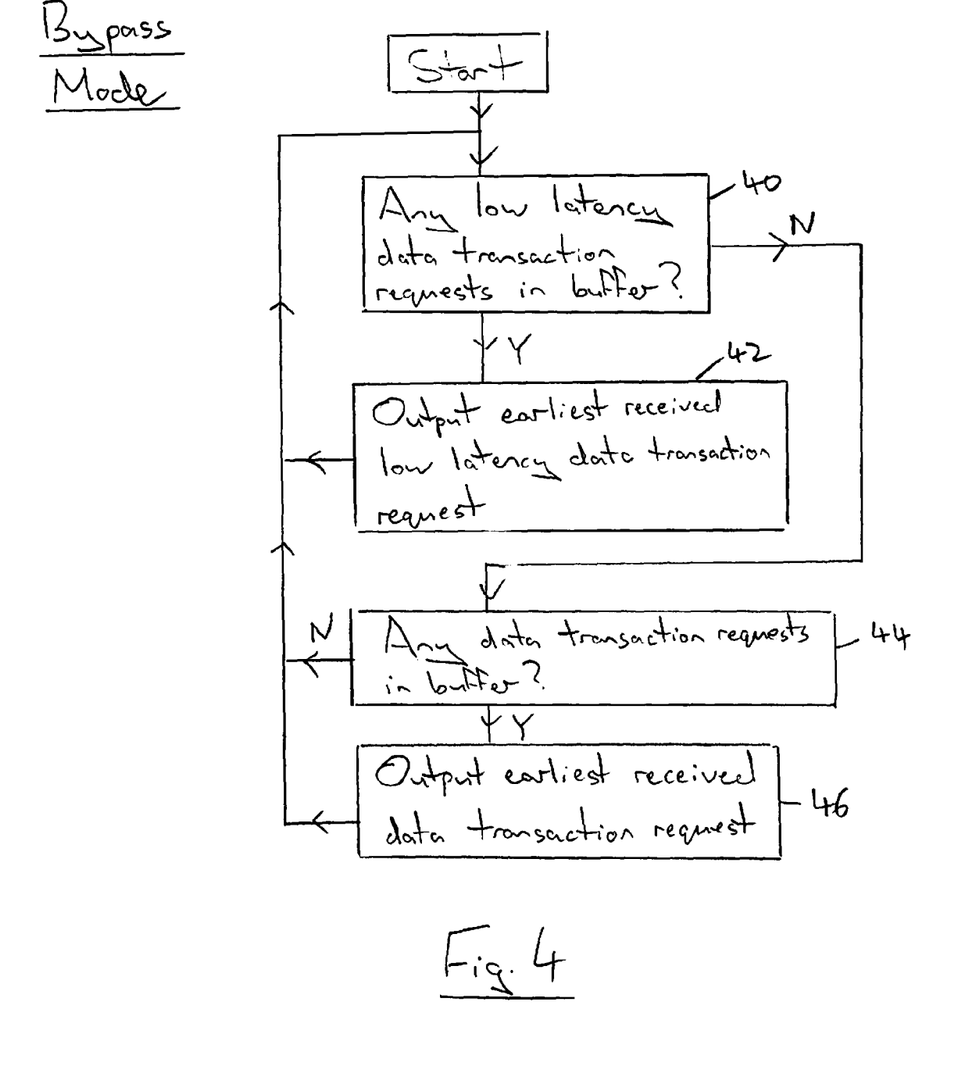
FIG. 4 is a flow diagram schematically illustrating operation within a bypass mode.

FIG. 4 schematically illustrates the operation of the output selection circuitry formed of the first multiplexer 22, the second multiplexer 24 and the output selection controller 26 in the example embodiment of FIG. 2 when operating in accordance with the bypass mode. In the bypass mode, the data transaction request which is selected for output will be the earliest received low latency data transaction request stored within the shared buffer circuitry 20 if the shared buffer circuitry 20 is storing one or more low latency data transaction requests. If the shared buffer circuitry 20 is not storing any low latency data transaction requests, then the data transaction request which is selected for output will be the earliest received data transaction request of any type which is stored within the shared buffer circuitry 20 at that point. This behaviour illustrated in FIG. 4.

At step 40 the output selection controller 26 determines whether any low latency data transaction requests are currently stored within the shared buffer circuitry 20. This determination may be made by reading low latency indication flags (LL) stored within the shared buffer circuitry 20 itself, or stored elsewhere within the buffer circuitry 14, such as within the output selection controller 26 itself. If there are one or more such low latency data transaction requests currently stored within the shared buffer circuitry 20, then processing proceeds to step 42 at which the earliest received one of these low latency data transaction requests currently stored within the shared buffer circuitry 20 is selected via first multiplexer 22 and second multiplexer 24 for output from the buffer circuitry 14.

If the determination at step 40 is that there are no low latency data transaction requests currently stored within the shared buffer circuitry 20, then processing proceeds to step 44 where a determination is made as to whether or not there are any data transaction requests currently stored within the shared buffer circuitry 20. If the shared buffer circuitry 20 is currently empty, then processing returns to step 40. If the determination at step 44 is that the shared buffer circuitry 20 is not empty, then processing proceeds to step 46 where the output selection controller 26 controls the second multiplexer 24 to select the earliest received data transaction request from the shared buffer circuitry 20 for output from the buffer circuitry 14. Processing then returns to step 40.

When operating in the non-bypass mode the output selection controller 26 serves to control the second multiplexer 24 to always select the earliest received data transaction request among any data transaction request stored within the shared buffer circuitry 20 for output from the buffer circuitry 14. This behaviour is illustrated in the flow diagram of FIG. 5.

Figure 5:
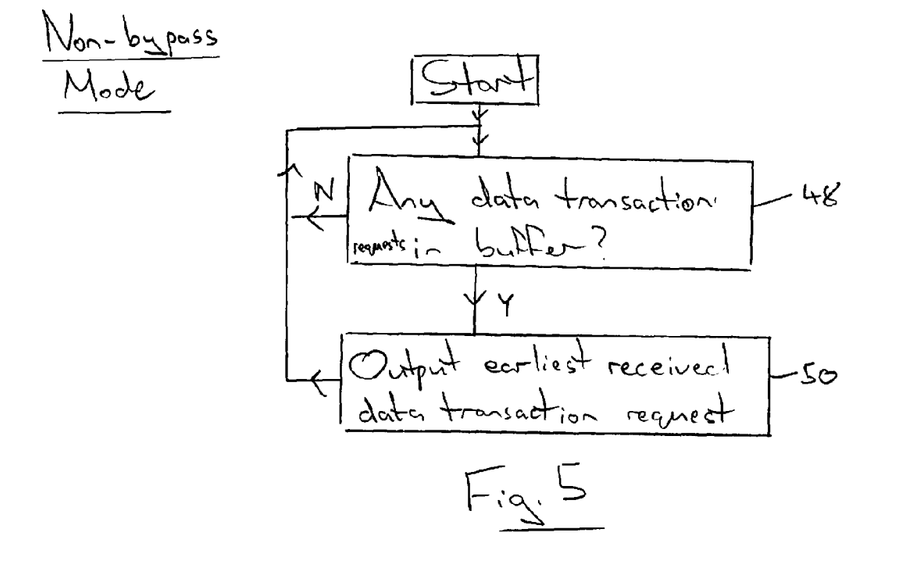
FIG. 5 is a flow diagram schematically illustrating operation within a non-bypass mode.

At step 48 a determination is made as to whether or not the shared buffer circuitry 20 is currently storing any data transaction requests. If there are any data transaction requests currently stored within the shared buffer circuitry 20, then step 50 serves to output the earliest received such data transaction request via the second multiplexer 24 to the output of the buffer circuitry 14. Processing then returns to step 48.

Figure 6:
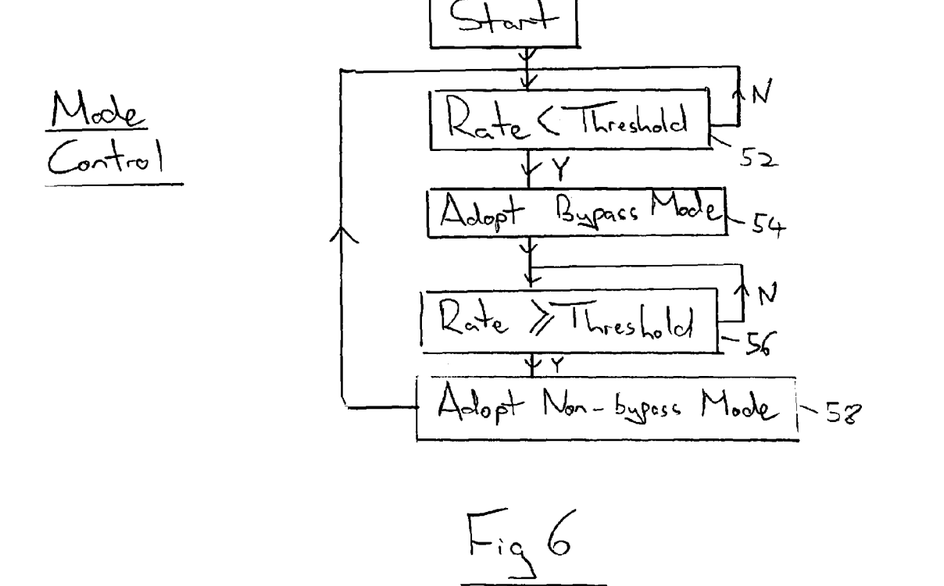
FIG. 6 is a flow diagram schematically illustrating the control of switching between modes.

FIG. 6 schematically illustrates the action of the bypass control circuitry 28 in controlling whether the output selection circuitry 22, 24, 26 operates in either the bypass mode or the non-bypass mode. At step 52 a determination is made as to whether or not the rate of output of low latency data transaction requests as detected by the rate detection circuitry 30 currently is less than a predetermined (optionally programmable) threshold value. If the detected rate is less than this threshold value, then processing proceeds to step 54 where the bypass mode is selected. Upon initial start-up, the detected rate will necessarily be below the threshold value and so upon start up the bypass mode will be typically selected first at step 54. If the detected rate is not less than the threshold rate, then the step at step 52 is repeated.

After the bypass mode has been adopted at step 54, step 56 serves to determine whether or not the detected rate exceeds or is equal to the threshold value and thereby control whether or not a switch should be made to the non-bypass mode at step 58. If the detected rate exceeds or is equal to the threshold value, then step 58 switches to the non-bypass mode and processing returns to step 52. The determination at step 56 may optionally apply a burstiness allowance. The detected rate may be permitted to exceed the threshold value for a predetermined time (for example, corresponding to a predetermined number of low latency data transaction requests being output) without triggering a switch to the non-bypass mode to be performed at step 58. The concept of a burstiness allowance will be familiar to those in this technical field from the behaviour of other forms of communication mechanism in which short bursts exceeding a threshold maximum permitted bandwidth are tolerated for a limited period.

The overall action of the buffer circuitry 14 in accordance with the described example embodiment above is to permit low latency data transaction requests received by the shared buffer circuitry 20 to be provided with a minimum bandwidth for passage through the shared buffer circuitry which is controlled by the threshold value. Thus, low latency data transaction requests may be effectively guaranteed a minimum bandwidth. At the same time, the action of the buffer circuitry 14 in switching to the non-bypass mode when the rate of output of low latency data transaction requests exceeds the threshold value serves to provide a maximum latency for passage through the shared buffer circuitry 20 for data transaction requests that are not low latency data transaction requests, i.e. such data transaction requests are not permitted to be permanently blocked by low latency data transaction requests.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for buffering received data transaction requests, said apparatus comprising:
   shared buffer circuitry configured to store, in order of reception time at said shared buffer circuitry, data transaction requests received from one or more data transaction sources;
   low latency identifying circuitry configured to identify low latency data transaction requests associated with low latency handling from among said data transaction requests received from said one or more data transaction sources and stored in said shared buffer circuitry;
   output selection circuitry configured to select a data transaction request for output from said shared buffer circuitry and to operate in a selectable one of:
      a bypass mode in which said data transaction request selected for output is one of:
         (a) if any low latency data transaction requests are stored in said shared buffer circuitry, an earliest received low latency data transaction stored in said shared buffer circuitry; and
         (b) if no low latency data transaction requests are stored in said shared buffer circuitry, an earliest received data transaction request among any data transaction requests stored in said shared buffer memory; and
      a non-bypass mode in which said data transaction request selected for output is an earliest received data transaction request among any data transaction requests stored in said shared buffer memory;
   rate detection circuitry configured to detect a rate of output of low latency data transaction requests from said shared buffer circuitry; and
   bypass control circuitry configured to compare said rate with a threshold value and to control said output selection circuitry to operate in one of:
      said bypass mode when said rate is less than said threshold value; and
      said non-bypass mode when said rate is greater than said threshold value.

2. Apparatus as claimed in claim 1, wherein each data transaction request received at said shared buffer circuitry includes a latency field and said latency identifying circuitry is configured to read said latency field to identify whether said data transaction request is a low latency data transaction request.

3. Apparatus as claimed in claim 2, wherein said latency field is a quality of service field and indicates a quality of service level associated with said data transaction request.

4. Apparatus as claimed in claim 2, wherein said latency field is a source identifier field indicating a source device that generated said data transaction request.

5. Apparatus as claimed in claim 1, wherein each data transaction request received at said shared buffer circuitry is associated with a memory address and said latency identifying circuitry is configured to read said memory address to identify whether said data transaction request is a low latency data transaction request.

6. Apparatus as claimed in claim 1, wherein said latency identifying circuitry is configured to mark with a low latency indication flag any low latency data transaction requests stored within said shared buffer circuitry.

7. Apparatus as claimed in claim 6, wherein said output selection circuitry is configured to identify any low latency data transaction requests stored within said shared buffer circuitry using said low latency indication flag.

8. Apparatus as claimed in claim 6, wherein said low latency indication flag is output from said shared buffer circuitry together with an associated data transaction request for use in controlling subsequent processing of said associated data transaction request.

9. Apparatus as claimed in claim 8, wherein said low latency indication flag is used in said subsequent processing to control whether or not said associated data transaction request will preempt one or more preceding pending data transaction requests.

10. Apparatus as claimed in claim 1, wherein low latency data transaction requests received by said shared buffer circuitry are provided with a minimum bandwidth for passage through said shared buffer circuitry controlled by said threshold value.

11. Apparatus as claimed in claim 1, wherein data transaction requests received by said shared buffer circuitry and that are not low latency data transaction requests are provided with a maximum latency for passage through said shared buffer circuitry controlled by said threshold value.

12. Apparatus as claimed in claim 1, wherein said bypass control circuitry is configured to apply a burstiness allowance that permits said rate to exceed said threshold value for a predetermined time without triggering said output selection circuitry to operate in said non-bypass mode.

13. Apparatus for buffering received data transaction requests, said apparatus comprising:
   shared buffer means for storing, in order of reception time at said shared buffer means, data transaction requests received from one or more data transaction sources;
   low latency identifying means for identifying low latency data transaction requests associated with low latency handling from among said data transaction requests received from said one or more data transaction sources and stored in said shared buffer means;
   output selection means for selecting a data transaction request for output from said shared buffer means and for operating in a selectable one of:
      a bypass mode in which said data transaction request selected for output is one of:
         (a) if any low latency data transaction requests are stored in said shared buffer means, an earliest received low latency data transaction stored in said shared buffer means; and
         (b) if no low latency data transaction requests are stored in said shared buffer means, an earliest received data transaction request among any data transaction requests stored in said shared buffer means; and
      a non-bypass mode in which said data transaction request selected for output is an earliest received data transaction request among any data transaction requests stored in said shared buffer means;
   rate detection means for detecting a rate of output of low latency data transaction requests from said shared buffer means; and
   bypass control means for comparing said rate with a threshold value and to control said output selection means to operate in one of:
      said bypass mode when said rate is less than said threshold value; and
      said non-bypass mode when said rate is greater than said threshold value.

14. A method of buffering received data transaction requests, said method comprising the steps of:

storing in shared buffer circuitry, in order of reception time at said shared buffer circuitry, data transaction requests received from one or more data transaction sources;

identifying low latency data transaction requests associated with low latency handling from among said data transaction requests received from said one or more data transaction sources and stored in said shared buffer means;

selecting a data transaction request for output from said shared buffer circuitry using a selectable one of:

a bypass mode in which said data transaction request selected for output is one of:

(a) if any low latency data transaction requests are stored in said shared buffer circuitry, an earliest received low latency data transaction stored in said shared buffer circuitry; and (b) if no low latency data transaction requests are stored in said shared buffer circuitry, an earliest received data transaction request among any data transaction requests stored in said shared buffer circuitry; and a non-bypass mode in which said data transaction request selected for output is an earliest received data transaction request among any data transaction requests stored in said shared buffer circuitry;

detecting a rate of output of low latency data transaction requests from said shared buffer circuitry; and comparing said rate with a threshold value and to control said steps of selecting to operate in one of:

said bypass mode when said rate is less than said threshold value; and said non-bypass mode when said rate is greater than said threshold value.

* * * * *